United States Patent
Williamson et al.

[11] Patent Number: 5,836,154
[45] Date of Patent: Nov. 17, 1998

[54] MULTI-STATE GASEOUS POLLUTANT DESTRUCTION APPARATUS AND METHOD

[75] Inventors: Weldon S. Williamson, Malibu; Franklin A. Dolezal, Reseda; David B. Cohn, Torrance; John H. S. Wang, Rancho Palos Verdes, all of Calif.

[73] Assignee: Raytheon Company, El Segundo, Calif.

[21] Appl. No.: 689,998

[22] Filed: Aug. 19, 1996

[51] Int. Cl.⁶ .................................................. F01N 3/00
[52] U.S. Cl. .................. 60/275; 422/186.04; 422/186.28
[58] Field of Search .............................. 60/275; 204/164; 422/186.04, 186.28, 188, 170, 172, 907

[56] References Cited

U.S. PATENT DOCUMENTS 3,862,043  1/1975  Haakenson .............................. 422/170
5,366,701  11/1994  Taylor ...................................... 60/275
5,655,210  8/1997  Gregoire .................................. 60/275

*Primary Examiner*—Thomas E. Denion
*Attorney, Agent, or Firm*—Colin M. Raufer; Leonard A. Alkov; Glenn H. Lenzen, Jr.

[57] ABSTRACT

A corona discharge pollutant destruction system has two or more corona discharge reactors in series, with each stage optimized for either oxidation of hydrocarbons (HC) and carbon monoxide (CO) or reduction of nitrogen oxides ($NO_x$). The reactors may be arranged with initial oxidation stages followed by reduction stages. Alternatively, the oxidation and reduction reactors may be arranged in alternate stages, with each oxidation reactor followed by a reduction reactor. The treatment of different pollutants by different reactors is achieved by supplying the different reactors with different power levels.

32 Claims, 3 Drawing Sheets

MULTI-STATE GASEOUS POLLUTANT DESTRUCTION APPARATUS AND METHOD

BACKGROUND OF THE INVENTION

1. Field of the Invention

This invention relates to the destruction of fluidborne pollutants by multi-stage corona discharge reactors.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the 1994 International Conf. on Plasma Science,* 6–8 Jun. 1994, Santa Fe, N. Mex., paper No. 1E6, page 88. Corona pollutant destruction has also been proposed for liquids, as disclosed in application Ser. No. 08/295,959, filed Aug. 25, 1994, "Corona Source for Producing Corona Discharge and Fluid Waste Treatment with Corona Discharge," and assigned to Hughes Aircraft Company, now doing business as Hughes Electronics.

In one system, described in Yamamoto et al., "Decomposition of Volatile Organic Compounds by a Packed Bed Reactor and a Pulsed-Corona Plasma Reactor," *Non-Thermal Plasma Techniques for Pollution Control,* NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 keV. A similar system is described in U.S. Pat. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A similar approach, but with a different reactor geometry, is taken in Rosocha et al., "Treatment of Hazardous Organic Wastes Using Silent-Discharge Plasmas," *Non-Thermal Plasma Techniques for Pollution Control,* NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

A block diagram of a generic single-stage corona discharge pollutant destruction apparatus is shown in FIG. 1. A corona discharge reactor 2 takes pollutant-bearing exhaust gas 12 from an engine 6 through an inlet conduit 8, treats the exhaust gas, and discharges the treated exhaust gas 14 through an outlet conduit 10. Major pollutants in the exhaust gas 12 from the engine 6 include various forms of nitrogen oxides ($NO_x$), hydrocarbons (HC), and carbon monoxide (CO). HC and CO are considered high energy level pollutants, which can be oxidized to produce water ($H_2O$) and carbon dioxide ($CO_2$). $NO_x$ compounds are considered low energy level pollutants, and need to absorb energy to be reduced to harmless diatomic nitrogen ($N_2$) and oxygen ($O_2$). When a power source 4 supplies high voltage pulses to the corona discharge reactor 2, HCs are oxidized to become $H_2O$ and $CO_2$, while CO is oxidized to become $CO_2$. At each voltage peak, corona charges are emitted within the reactor 2, producing free radicals that oxidize HC to generate $CO_2$ and $H_2O$, and CO to generate $CO_2$. In general, high voltage pulses are very effective in destroying HC and CO, but do not help the reduction of $NO_x$ into $N_2$ and $O_2$. Experiments have shown that corona generation using high voltages (up to 12 kV) may even produce some additional $NO_x$. On the other hand, low voltage pulses are highly efficient in reducing $NO_x$, but are very poor at oxidizing HC.

SUMMARY OF THE INVENTION

In view of the above problems, the present invention provides a corona discharge pollutant destruction system having two or more reactor stages for destroying both HC and $NO_x$. Some of the reactor stages are dedicated to the oxidation of HC and CO, while others are dedicated to the reduction of $NO_x$. In a two-stage system, the first corona reactor stage operates at a high voltage to oxidize HC and CO, and the second stage operates at a low voltage to reduce $NO_x$. In a multi-stage system, the reactor stages may be arranged so that the initial stages operate at high voltages to progressively destroy HC and CO, and subsequent stages operate at low voltages to progressively destroy $NO_x$. The corona discharge energy in each reactor stage is determined by the voltage level, pulse width and pulse repetition frequency, which are precisely controlled by a computer to minimize the amount of HC, CO, and $NO_x$ in the treated exhaust gas.

In another embodiment, oxidation and reduction are performed in alternate reactor stages. The odd-ordered stages operate at high voltages to destroy HC and CO, while the even-ordered stages operate at low voltages to destroy $NO_x$. Again, the voltage level, pulse width and pulse repetition frequency are precisely controlled by a computer to minimize the amount of the pollutants in the treated gas.

These and other features and advantages of the invention will be apparent to those skilled in the art from the following detailed description, taken together with the accompanying drawings, in which:

DETAILED DESCRIPTION OF THE INVENTION

The present invention provides a multi-stage corona discharge reactor system and method for destroying gaseous pollutants such as HC, CO and $NO_x$.

Figure 2:
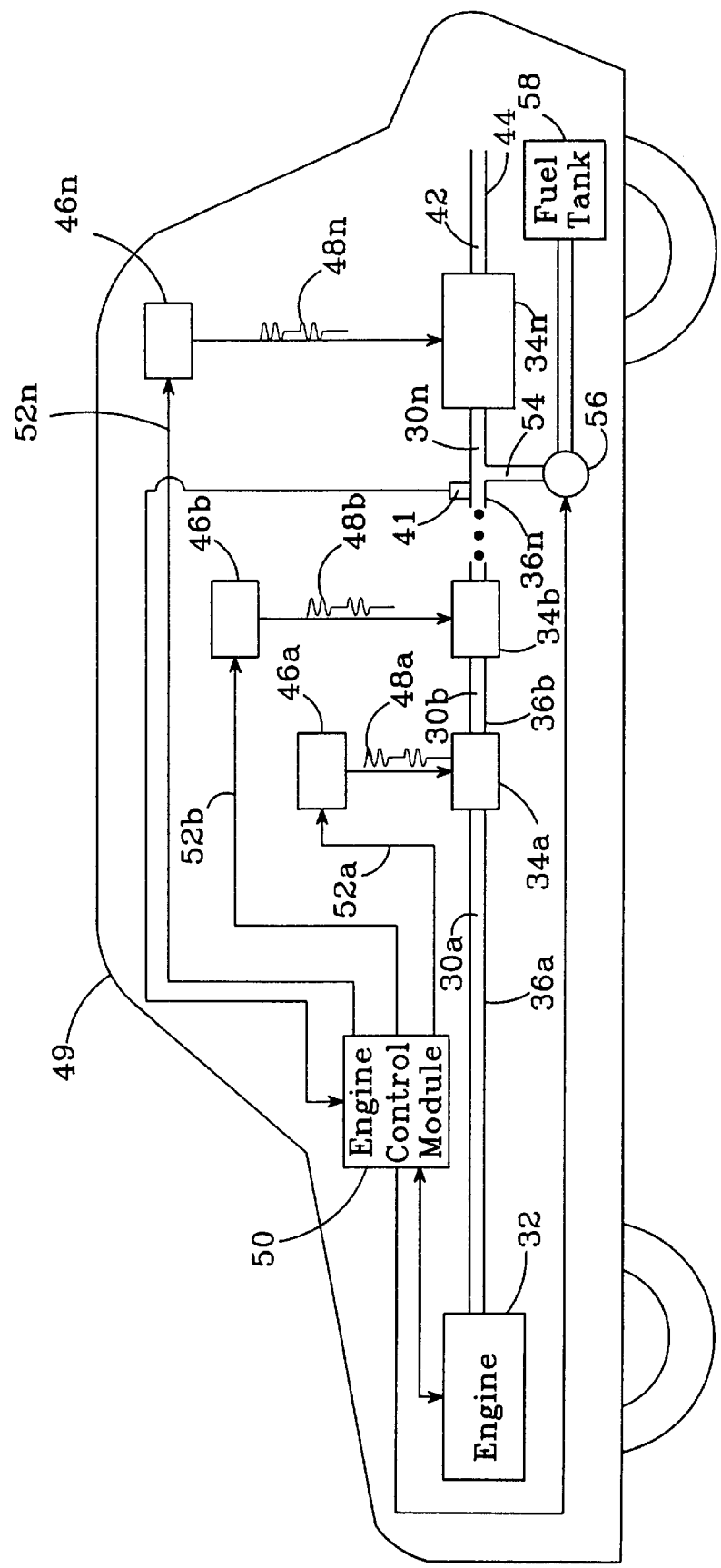
FIG 2 is a block diagram of a gaseous pollutant destruction system using multi-stage corona discharge reactors in accordance with the invention.

In accordance with the invention, schematically shown in FIG. 2, exhaust gas 30a from an engine 32 is fed to a first-stage reactor 34a through a conduit 36a, treated exhaust gas 30b from the first-stage reactor 34a is fed to a second-stage reactor 34b through a conduit 36b, and so on until the last reactor 34n is reached. The last reactor 34n receives exhaust gas 30n from a conduit 36n and sends finally treated exhaust gas 42 through an outlet conduit 44. The entire pollutant destruction apparatus can be implemented in an automobile 49, which has an internal combustion engine 32 of either gasoline or diesel type, for the treatment of automotive exhaust gas to meet stringent air quality standards.

Corona discharges in reactors 34a, 34b, . . . 34n are generated by power supplied from respective power sources 46a, 46b, . . . 46n, which generate high-voltage waveforms 48a, 48b, . . . 48n, preferably having peak voltages in the range of about 5–15 kV, to the reactor stages 34a, 34b, . . . 34n. The high-voltage waveforms 48a, 48b, . . . 48n are preferably pulse-modulated sinusoids, characterized by power generation characteristics which include voltage level, oscillation frequency, pulse width and pulse repetition frequency. In general, corona discharge occurs only when the voltage reaches a breakdown level close to the positive and negative peaks of each sinusoidal lobe. The number of discharges per unit of time depends upon the oscillation frequency and the pulse duty cycle, which is defined as the product of the pulse width and the pulse repetition frequency. In general, increasing the oscillation frequency and/or increasing the duty cycle increases the average corona discharge power delivered to a reactor.

Each reactor stage performs either oxidation or reduction at a particular level of intensity. The type and intensity of chemical reaction in each reactor stage is determined by the amount of corona discharge, which is in turn determined by the electrical energy supplied to the reactor. In general, high-voltage pulses in the range of about 10–15 kV are efficient in oxidizing CO and HC, while lower voltages are preferred for reducing $NO_x$ compounds. The oscillation frequency and the duty cycle, which also determine the average power for each corona discharge reaction, are usually less for reduction reactors than for oxidation reactors.

It is preferred that the power sources 46a, 46b, . . . 46n be precisely controlled by a computerized control module 50 which senses pollutant generation characteristics from the engine 32, including the exhaust temperature and the amounts of CO, HC and $NO_x$. The control module 50 computes the desired power generation characteristics for the power sources 46a, 46b, . . . 46n to minimize the amount of CO, HC and $NO_x$ in the finally treated exhaust gas 42, and sends commands to the power sources 46a, 46b, . . . 46n through computer interface links 52a, 52b, . . . 52n. The power sources 46a, 46b, . . . 46n are preferably adjustable to generate the desired power generation characteristics for the respective reactor stages 34a, 34b, . . . 34n.

At least two reactor stage embodiments for oxidation and reduction that use the general approach of FIG. 2 are feasible. In one embodiment, the initial reactor stages 34a, 34b, . . . are oxidation reactors, primarily for oxidizing CO and HC compounds to generate $CO_2$ and $H_2O$. These oxidation reactors use high-voltage pulses to destroy CO and HC efficiently, but are inefficient in reducing $NO_x$ in the exhaust gas stream into $N_2$ and $O_2$. In some cases, the high-voltage pulses may even generate some additional $NO_x$. This is not a concern, since the $NO_x$ compounds are treated in subsequent reactor stages . . . 34n–2, 34n–1, 34n, which are reduction reactors primarily for reducing various $NO_x$ compounds into $N_2$ and $O_2$.

These reduction reactors use relatively low voltage pulses to reduce $NO_x$, but do not regenerate CO or HC from the $CO_2$ and $H_2O$ formed in the oxidation reactors.

In another embodiment, the oxidation and reduction reactors are arranged alternately in series such that odd-ordered reactors are for oxidation and even-ordered reactors are for reduction. In this arrangement, the first-stage reactor destroys most of the CO and HC, but leaves a small quantity of HC to facilitate the reduction of $NO_x$ in the second-stage reduction reactor. The third-stage reactor destroys most of the remaining HC and CO after the second stage, the fourth-stage reactor then further reduces the remaining $NO_x$ compounds, and so on. The intensities of treatment in the latter reactor stages for oxidation and reduction are less than those of the former oxidation and reduction stages, as the amounts of HC, CO and $NO_x$ are progressively reduced from the initial to the final stages.

When a reduction reactor is preceded by an oxidation reactor, it is desirable to have a small quantity of HC left over by the oxidation reactor to supply energy for reduction of $NO_x$ in the reduction reactor. However, if the oxidation of HC is too efficient in the previous oxidation reactors, not enough HC may be left over. To supply sufficient hydrocarbons for the reduction reactors, fuel can be injected into the inlet conduits of one or more of the reduction reactors to enhance the reduction of $NO_x$ compounds. In a preferred embodiment, the last reactor 34n is a reduction reactor for final treatment of $NO_x$ compounds before the exhaust gas 42 is released into the atmosphere. A small quantity of fuel 54 is injected from a fuel tank 58 into the inlet conduit 30n of reactor 34n by a pump 56. It is preferred that the pump 56 be controlled by the computerized control module 50 that precisely determines the rate of fuel transfer from the pump 56 into the reactor 34n. A pollutant sensor 41 is placed in the inlet conduit 3n to sense the amounts of $NO_x$ in the exhaust gas and sends the $NO_x$ data to the control module 50, which causes the pump 56 to adjust the amount of fuel 54 injected into the reduction reactor 34n accordingly. To simplify the pollutant destruction system, the fuel 54 is preferably the same as that used for combustion in the engine 32, so that a separate fuel tank need not be provided. For example, to treat $NO_x$ generated by a gasoline engine, a small quantity of gasoline can be injected into the inlet conduit 30n of reactor 34n to facilitate the reduction of $NO_x$ into $N_2$ and $O_2$.

Figure 1:
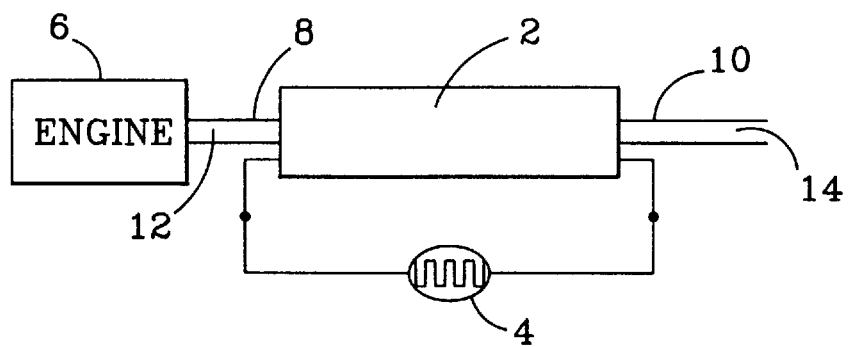
FIG. 1, described above, is a block diagram of a conventional single-stage corona discharge pollutant destruction apparatus.
Figure 4:
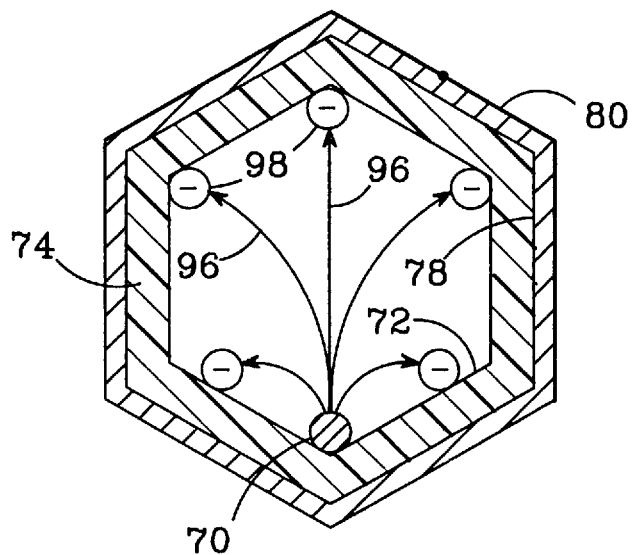
FIG. 4 is a sectional view of the apparatus of FIG. 3 taken along the section line 3—3 of FIG. 3.
Figure 3:
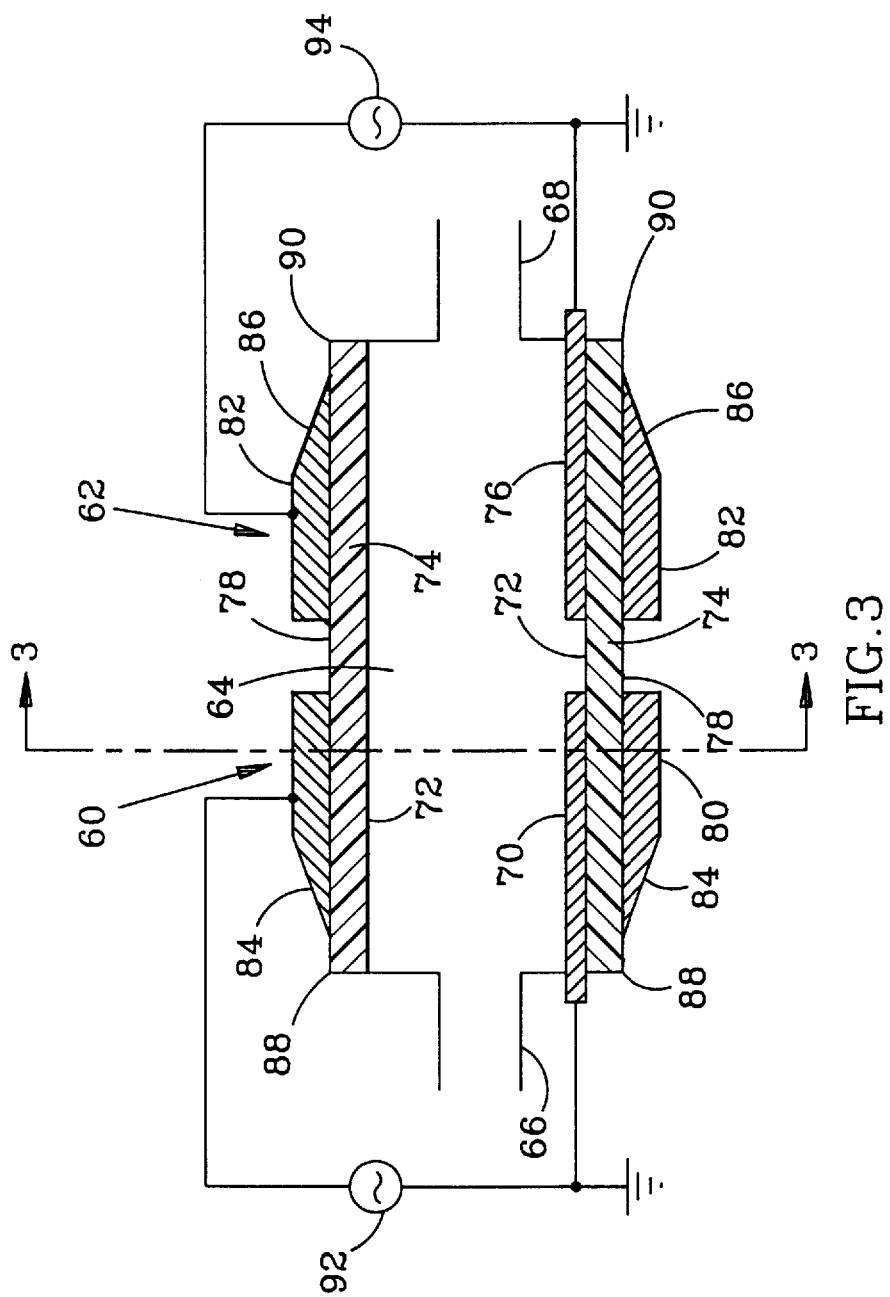
FIG. 3 is a sectional view of a pollutant destruction apparatus with two stages of corona discharge reactors in a single reactor chamber structure.

FIG. 3 shows a preferred embodiment of a two-stage corona discharge reactor system with an oxidation reactor 60 and a reduction reactor 62 formed within a single reactor structure and sharing a single reactor chamber 64. The reactor chamber 64 is defined by the inner surface 72 of a cylindrically shaped hollow dielectric 74. The cylindrical dielectric 74 may have various cross-sectional shapes such as circular, for example, but it preferably has an equilateral hexagonal cross-section, as shown in FIG. 4, for strong structural integrity. This configuration allows an exhaust gas to flow through both the oxidation reactor 60 and the reduction reactor 62 without interruption, and is therefore efficient in allowing a large quantity of exhaust gas to pass through. The exhaust gas flows into the oxidation reactor 60 from an inlet conduit 66 and exits the reduction reactor 62 through an outlet conduit 68. An advantage of this structure is that a large pressure difference is not required to force the exhaust gas to pass through the chamber 64.

The oxidation reactor 60 is formed by the portion of the reactor chamber 64 closer to the inlet conduit 66, while the reduction reactor 62 is formed by the portion of the reactor chamber 64 closer to the outlet conduit 68. The oxidation and reduction reactors 60 and 62 contain respective inner electrodes 70 and 76, which are electrically isolated from each other. Preferably the inner electrodes are securely attached to the inner surface 72 of the dielectric 74 by vapor deposition. The outer surface 78 of the dielectric 74 is surrounded by mutually spaced outer electrodes 80 and 82 for the oxidation reactor and the reduction reactor 62, respectively. The outer electrodes 80, 82 preferably have respective tapered transitions 84, 86 near the ends 88, 90 of the reactor chamber 64 where the thicknesses of the outer electrodes 80, 82 gradually decrease to zero. The tapered transitions 84, 86 provide a grading of voltage levels and help prevent arcing at the electrodes' edges.

Separate power sources 92 and 94 are connected to the respective oxidation and reduction reactors 60 and 62. The inner electrodes 70 and 76 are preferably grounded while the outer electrodes 80 and 82 are supplied with pulsed sinusoidal voltages. It is preferred that the voltage applied across the inner and outer electrodes 70 and 80 of the oxidation reactor 60 be greater than the voltage applied across the inner and outer electrodes 76 and 82 of the reduction reactor 62. When the outer electrode 80 is at a negative voltage peak while the inner electrode 70 is grounded, the voltage difference generates electric field lines 96 as shown in FIG. 4 to induce surface charges 98 on the inner surface 72 of the dielectric 74, thereby resulting in a corona discharge.

The oxidation reactor 60 is positioned upstream of the reactor chamber 64 to oxidize HC and CO, while the reduction reactor 62 is positioned downstream to reduce $NO_x$, including any additional $NO_x$ produced by the oxidation reaction of the reactor 60. Because different power generation characteristics are required for oxidation and reduction, the electrodes 70, 80 of the oxidation reactor 60 must be sufficiently spaced apart from the electrodes 76, 82 of the reduction reactor 62 to prevent arcing or other electrical interactions between them.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A corona discharge pollutant destruction apparatus, comprising:

a pollutant generator capable of generating an exhaust gas including multiple types of pollutants;

a plurality of corona discharge reactors positioned to receive said exhaust gas in series and to treat said pollutants, wherein said plurality of corona discharge reactors comprise at least one oxidation reactor and at least one reduction reactor, said oxidation reactors connected to oxidize relatively high energy level pollutants, and said reduction reactors connected to reduce relatively low energy level pollutants and wherein said oxidation reactors and said reduction reactors are connected alternately in series, each reduction reactor positioned to treat said low energy level pollutants subsequent to treatment of said high energy level pollutants by a preceding oxidation reactor; and a power source connected to supply different ones of said reactors with different levels of electrical power to generate corona discharges in said reactors for treating different respective pollutants in said exhaust gas.

2. The apparatus of claim 1, wherein said high energy level pollutants include hydrocarbons (HC) and carbon monoxide (CO), and said low energy level pollutants include at least one nitrogen oxide ($NO_x$).

3. The apparatus of claim 2, further comprising a fuel injection system connected to provide fuel to at least one of said reduction reactors to facilitate reduction of said $NO_x$ into nitrogen ($N_2$) and oxygen ($O_2$).

4. The apparatus of claim 1, further comprising a control module connected to control said power source's power generation characteristics.

5. The apparatus of claim 4, further comprising a pollutant sensor connected to sense said pollutant generator's pollutant generation characteristics and to provide a corresponding signal to said control module, and said control module is connected to adjust the energization of at least one of said reactors in response to said signal.

6. The apparatus of claim 5, wherein the pollutant generation characteristics sensed by said pollutant sensor include the amounts of HC, CO and $NO_x$ in said exhaust gas.

7. The apparatus of claim 4, wherein said electrical power is characterized by a pulse-modulated substantially sinusoidal waveform, and the power generation characteristics controlled by said control module include one or more of voltage, pulse width, pulse repetition frequency and oscillation frequency.

8. The apparatus of claim 1, wherein said plurality of corona discharge reactors comprise said oxidation reactor and said reduction reactor in a single reactor chamber that is defined by the inner surface of a hollow cylindrical dielectric, and each of said reactors has at least one inner electrode inside said dielectric and an outer electrode outside said dielectric.

9. The apparatus of claim 8, wherein said inner electrodes are positioned on the inner surface of said dielectric, and said outer electrodes are positioned on the dielectric's outer surface.

10. The apparatus of claim 9, wherein said reactor chamber include inlet and outlet conduits, said oxidation reactor's outer electrode comprises a transition portion of reduced thickness adjacent said inlet conduit, and said reduction reactor's outer electrode comprises a transition portion of reduced thickness adjacent said outlet conduit.

11. The apparatus of claim 8, wherein said oxidation reactor is positioned to treat said high energy level pollutants prior to treatment of said low energy level pollutants by said reduction reactor.

12. A two-stage corona discharge apparatus, comprising:

a hollow dielectric having an inner surface which defines a reactor chamber and an outer surface;

at least one oxidation inner electrode within a first portion of said reactor chamber;

at least one reduction inner electrode within a second portion of said reactor chamber;

oxidation and reduction outer electrodes on said dielectric's outer surface in alignment with said oxidation and reduction inner electrodes, respectively;

said oxidation inner electrode, said oxidation outer electrode and said first portion of said reactor chamber defining an oxidation reactor capable of treating high energy level pollutants; and said reduction inner electrode, said reduction outer electrode and said second portion of said reactor chamber defining a reduction reactor capable of treating low energy level pollutants.

13. The apparatus of claim 12, wherein said oxidation and reduction inner electrodes are positioned on said dielectric's inner surface.

14. The apparatus of claim 15, wherein said reactor chamber includes inlet and outlet conduits for a polluted gas, said oxidation reactor is positioned closer to said inlet conduit and said reduction reactor is positioned closer to said outlet conduit so that said oxidation reactor treats said high energy level pollutants prior to treatment of said low energy level pollutants by said reduction reactor.

15. The apparatus of claim 14, wherein said oxidation reactor's outer electrode includes a transition portion of reduced thickness adjacent said inlet conduit, and said reduction reactor's outer electrode comprises a transition portion of reduced thickness adjacent said outlet conduit.

16. A corona discharge pollutant destruction apparatus, comprising:
   a plurality of corona discharge reactors positioned to receive an exhaust gas in series and to treat multiple types of pollutants in said exhaust gas, wherein said plurality of corona discharge reactors comprise at least one oxidation reactor and at least one reduction reactor, said oxidation reactors connected to oxidize relatively high energy level pollutants, and said reduction reactors connected to reduce relatively low energy level pollutants and said high energy level pollutants include hydrocarbons (HC) and carbon monoxide (CO), and said low energy level pollutants include at least one nitrogen oxide ($No_x$);
   a power source connected to supply different ones of said reactors with different levels of electrical power to generate corona discharges in said reactors for treating different respective pollutants in said exhaust gas; and
   a fuel injection system connected to provide fuel to at least one of said reduction reactors to facilitate reduction of said $NO_x$ into nitrogen ($N_2$) and oxygen ($O_2$).

17. The apparatus of claim 16, wherein said plurality of corona discharge reactors comprise at least one oxidation reactor and at least one reduction reactor, said oxidation reactors connected to oxidize relatively high energy level pollutants, and said reduction reactors connected to reduce relatively low energy level pollutants.

18. The apparatus of claim 17, wherein said high energy level pollutants include hydrocarbons (HC) and carbon monoxide (CO), and said low energy level pollutants include at least one nitrogen oxide ($NO_x$).

19. The apparatus of claim 16, wherein a series of said oxidation reactors are positioned to treat said high energy level pollutants and a series of said reduction reactors are positioned to treat said low energy level pollutants subsequent to treatment by said oxidation reactors.

20. The apparatus of claim 16, wherein said oxidation reactors and said reduction reactors are connected alternately in series, each reduction reactor positioned to treat said low energy level pollutants subsequent to treatment of said high energy level pollutants by a preceding oxidation reactor.

21. The apparatus of claim 16, further comprising a control module connected to control said power source's power generation characteristics.

22. The apparatus of claim 21, further comprising a pollutant sensor connected to sense the pollutant generation characteristics and to provide a corresponding signal to said control module, and said control module is connected to adjust the energization of at least one of said reactors in response to said signal.

23. The apparatus of claim 22, wherein the pollutant generation characteristics sensed by said pollutant sensor include the amounts of HC, CO and $NO_x$ in said exhaust gas.

24. The apparatus of claim 22, wherein said electrical power is characterized by a pulse-modulated substantially sinusoidal waveform, and the power generation characteristics controlled by said control module include one or more of voltage, pulse width, pulse repetition frequency and oscillation frequency.

25. An automobile, comprising:
   an engine capable of generating an exhaust gas including multiple types of pollutants; and
   a pollutant destruction apparatus, comprising:
      a plurality of corona discharge reactors positioned to receive said exhaust gas in series and to treat said pollutants; and
      a power source connected to supply different ones of said reactors with different levels of electrical power to generate corona discharges in said reactors for treating different respective pollutants in said exhaust gas.

26. The automobile of claim 25, wherein said plurality of corona discharge reactors comprise at least one oxidation reactor and at least one reduction reactor, said oxidation reactors connected to oxidize relatively high energy level pollutants, and said reduction reactors connected to reduce relatively low energy level pollutants.

27. The automobile of claim 26, wherein said high energy level pollutants include hydrocarbons (HC) and carbon monoxide (CO), and said low energy level pollutants include at least one nitrogen oxide ($NO_x$).

28. The automobile of claim 27, further comprising a fuel injection system connected to provide fuel to at least one of said reduction reactors to facilitate reduction of said $NO_x$.

29. A corona discharge pollutant destruction apparatus, comprising:
   a pollutant generator capable of generating an exhaust gas including multiple types of pollutants;
   a plurality of corona discharge reactors positioned to receive said exhaust gas in series and to treat said pollutants, wherein said plurality of corona discharge reactors comprise at least one oxidation reactor and at least one reduction reactor, said oxidation reactors connected to oxidize relatively high energy level pollutants, and said reduction reactors connected to reduce relatively low energy level pollutants and wherein said oxidation reactors and said reduction reactors are connected alternately in series, each reduction reactor positioned to treat said low energy level pollutants subsequent to treatment of said high energy level pollutants by a preceding oxidation reactor; p1 a power source connected to supply different ones of said reactors with different levels of electrical power to generate corona discharges in said reactors for treating different respective pollutants in said exhaust gas;
   a control module connected to control said power source's power generation characteristics; and
   a pollutant sensor connected to sense said pollutant generator's pollutant generation characteristics and to provide a corresponding signal to said control module, and said control module is connected to adjust the energization of at least one of said reactors in response to said signal, wherein the pollutant generation characteristics sensed by said pollutant sensor include the amounts of HC, CO and $NO_x$ in said exhaust gas.

30. A corona discharge pollutant destruction apparatus, comprising:
   a pollutant generator capable of generating an exhaust gas including multiple types of pollutants;
   a plurality of corona discharge reactors positioned to receive said exhaust gas in series and to treat said pollutants, wherein said plurality of corona discharge reactors comprise at least one oxidation reactor and at least one reduction reactor, said oxidation reactors connected to oxidize relatively high energy level pollutants, and said reduction reactors connected to reduce relatively low energy level pollutants and wherein said oxidation reactors and said reduction reactors are connected alternately in series, each reduction reactor positioned to treat said low energy level pollutants subsequent to treatment of said high energy level pollutants by a preceding oxidation reactor; and a power source connected to supply different ones of said reactors with different levels of electrical power to generate corona discharges in said reactors for treating different respective pollutants in said exhaust gas, wherein said plurality of corona discharge reactors comprise an oxidation reactor and a reduction reactor in a single reactor chamber that is defined by the inner surface of a hollow cylindrical dielectric, and each of said reactors has at least one inner electrode inside said dielectric and an outer electrode outside said dielectric.

31. A corona discharge pollutant destruction apparatus, comprising:

a plurality of corona discharge reactors positioned to receive an exhaust gas in series and to treat multiple types of pollutants in said exhaust gas, wherein said plurality of corona discharge reactors comprise at least one oxidation reactor and at least one reduction reactor, said oxidation reactors connected to oxidize relatively high energy level pollutants, and said reduction reactors connected to reduce relatively low energy level pollutants and said high energy level pollutants include hydrocarbons (HC) and carbon monoxide (CO), and said low energy level pollutants include at least one nitrogen oxide ($NO_x$);

a fuel injection system connected to provide fuel to at least one of said reduction reactors to facilitate reduction of said $NO_x$ into nitrogen ($N_2$) and oxygen ($O_2$), wherein said oxidation reactors and said reduction reactors are connected alternately in series, each reduction reactor positioned to treat said low energy level pollutants subsequent to treatment of said high energy level pollutants by a preceding oxidation reactor; and a power source connected to supply different ones of said reactors with different levels of electrical power to generate corona discharges in said reactors for treating different respective pollutants in said exhaust gas.

32. A corona discharge pollutant destruction apparatus, comprising:

a plurality of corona discharge reactors positioned to receive an exhaust gas in series and to treat multiple types of pollutants in said exhaust gas, wherein said plurality of corona discharge reactors comprise at least one oxidation reactor and at least one reduction reactor, said oxidation reactors connected to oxidize relatively high energy level pollutants, and said reduction reactors connected to reduce relatively low energy level pollutants and said high energy level pollutants include hydrocarbons (HC) and carbon monoxide (CO), and said low energy level pollutants include at least one nitrogen oxide ($NO_x$);

a power source connected to supply different ones of said reactors with different levels of electrical power to generate corona discharges in said reactors for treating different respective pollutants in said exhaust gas;

a control module connected to control said power source's power generation characteristics; and a pollutant sensor connected to sense the pollutant generation characteristics and to provide a corresponding signal to said control module, and said control module is connected to adjust the energization of at least one of said reactors in response to said signal, wherein the pollutant generation characteristics sensed by said pollutant sensor include the amounts of HC, CO and $NO_x$ in said exhaust gas.

* * * * *